US011425129B1

(12) United States Patent
Oliker (10) Patent No.: US 11,425,129 B1
(45) Date of Patent: Aug. 23, 2022

(54) SYSTEM AND METHOD OF SECURED COMMUNICATION

(71) Applicant: Yaron Oliker, Yodfat (IL)

(72) Inventor: Yaron Oliker, Yodfat (IL)

( * ) Notice: Subject to any disclaimer, the term of this patent is extended or adjusted under 35 U.S.C. 154(b) by 0 days.

(21) Appl. No.: 17/567,181

(22) Filed: Jan. 3, 2022

Related U.S. Application Data

(60) Provisional application No. 63/145,007, filed on Feb. 3, 2021.

(51) Int. Cl.
*H04L 9/40* (2022.01)

(52) U.S. Cl.
CPC .......... *H04L 63/10* (2013.01); *H04L 63/0428* (2013.01); *H04L 63/08* (2013.01); *H04L 63/1441* (2013.01)

(58) Field of Classification Search
CPC ..... H04L 63/10; H04L 63/0428; H04L 63/08; H04L 63/1441
See application file for complete search history.

(56) References Cited

U.S. PATENT DOCUMENTS

| | | | |
|---|---|---|---|
| 9,426,140 B2 | 8/2016 | Palmeri et al. | |
| 10,678,522 B1* | 6/2020 | Yerramreddy | G06F 8/10 |
| 11,108,828 B1* | 8/2021 | Curtis | H04L 63/0263 |
| 11,170,099 B1* | 11/2021 | Sandall | G06F 21/54 |
| 2010/0115585 A1* | 5/2010 | Cohen | G06F 9/547 709/219 |
| 2012/0023243 A1* | 1/2012 | Xu | H04L 69/32 709/228 |
| 2014/0046906 A1* | 2/2014 | Patiejunas | G06F 16/2365 707/661 |
| 2016/0094551 A1 | 3/2016 | Sugihara et al. | |
| 2016/0224799 A1* | 8/2016 | Uzun | H04L 63/045 |
| 2019/0052462 A1 | 2/2019 | Kotwal et al. | |
| 2019/0188288 A1* | 6/2019 | Holm | G06F 16/211 |
| 2019/0213326 A1* | 7/2019 | Dykes | G06N 20/00 |
| 2020/0192643 A1* | 6/2020 | Doyle | H04L 67/10 |
| 2020/0401506 A1* | 12/2020 | Sathianarayanan | G06F 9/54 |
| 2021/0067337 A1* | 3/2021 | Bahrami | H04L 9/30 |
| 2021/0373984 A1* | 12/2021 | Lu | G06F 16/958 |
| 2022/0066847 A1* | 3/2022 | Liu | G06F 16/955 |

FOREIGN PATENT DOCUMENTS

| | | |
|---|---|---|
| EP | 3584994 A1 | 12/2019 |
| WO | WO 2021011079 | 1/2021 |

OTHER PUBLICATIONS

International Search Report for PCT application No. PCT/IL2022/050006, dated Apr. 11, 2022.

* cited by examiner

*Primary Examiner* — Aravind K Moorthy
(74) *Attorney, Agent, or Firm* — Pearl Cohen Zedek Latzer Baratz LLP (57) ABSTRACT

Systems and methods of securing communication between a server and a client device, including: analyzing an application programming interface (API) payload from the server to identify server's object references, retrieving an authenticated client reference, encrypting at least one pair of server's object reference and client reference based on a predefined cryptographic function, analyzing a payload of an API call from the client device to identify the at least one encrypted pair, decrypting the at least one encrypted pair identified from the API call, to receive at least one pair of server's object reference and client reference, and blocking the API call if the decrypted client reference does not match the retrieved authenticated client reference.

20 Claims, 9 Drawing Sheets

Analyzing, by a processor, an API payload from the server to identify server's object references

401

Retrieving, by the processor, an authenticated client reference, wherein the client reference is retrieved during a current communication session between the server and the client device

402

Encrypting, by the processor, at least one pair of server's object reference and client reference based on a predefined cryptographic function

Analyzing, by a processor, an API payload from the server to identify server's object references

501

Retrieving, by the processor, a session reference, wherein the session reference is retrieved during a current communication session between the server and the client device

502

Encrypting, by the processor, at least one pair of server's object reference and session reference based on a predefined cryptographic function

Fig. 5B

SYSTEM AND METHOD OF SECURED COMMUNICATION

CROSS REFERENCE TO RELATED APPLICATIONS

This application claims benefit from prior Provisional Application No. 63/145,007, filed on Feb. 3, 2021, incorporated herein by reference in its entirety.

FIELD OF THE INVENTION

The present invention relates to network security. More particularly, the present invention relates to systems and methods for Application Programming Interface (API) traffic protection, analysis and network security.

BACKGROUND

In recent years, API's as communication between servers and clients, have become one of the fastest growing cybersecurity threats enterprises face. In API calls, the client application can invoke specific operations. The biggest open vulnerability (according to the Open Web Application Security Project, or OWASP), is referred to as BOLA (Broken Object Level Authorization). Current API protection solutions leverage machine learning and Artificial Intelligence (AI) to establish a baseline of traffic to a specific API, and detect deviations from this baseline.

These solutions can provide a certain level of protection but are still vulnerable to attackers trying to masquerade as legitimate users. Additionally, such solutions are expensive and difficult to set up, and inevitably introduce latency to the system.

SUMMARY

A system and method that may prevent malicious application programming interface attacks. Embodiments may prevent object level authorization access issues by providing each client with a unique set of object identifications (ID's) that are encrypted and unique.

There is thus provided, in accordance with some embodiments of the invention, a method of securing communication between a server and a client device, the method including: analyzing, by a processor, an application programming interface (API) payload from the server to identify server's object references; retrieving, by the processor, an authenticated client reference, where the client reference is retrieved during a current communication session between the server and the client device; encrypting, by the processor, at least one pair of server's object reference and client reference based on a predefined cryptographic function; analyzing, by the processor, a payload of an API call from the client device to identify the at least one encrypted pair; decrypting, by the processor, the at least one encrypted pair identified from the API call, to receive at least one pair of server's object reference and client reference, where the decryption is carried out based on the predefined cryptographic function; and blocking the API call if the decrypted client reference does not match the retrieved authenticated client reference.

In some embodiments, the blocking may include instructing, by the processor, the server to block the API call. In some embodiments, the client device to block, by the processor, the API call. In some embodiments, the at least one encrypted pair may be sent, by the processor, to the client device. In some embodiments, server's object references from the payload may be replaced, by the processor, with the at least one encrypted pair.

In some embodiments, the client reference may be authenticated by an authentication layer at the server. In some embodiments, at least one pair of object reference and client reference may be encrypted as a global unique identifier (GUID).

In some embodiments, the authentication is at least one access token or a JSON web token (JWT). In some embodiments, every object reference may be encrypted, by the processor, with a hash function, and a hash map may be generated, by the processor, to point to the identified object reference. In some embodiments, server's object references may be identified by identifying fields within the payload from the server that correspond to object references.

There is thus provided, in accordance with some embodiments of the invention, a system for secured communication between a server and a client device, the system including: a processor, in communication with the server and the client device and configured to: analyze an application programming interface (API) payload from the server to identify server's object references; retrieve an authenticated client reference, where the client reference is retrieved during a current communication session between the server and the client device; encrypt at least one pair of server's object reference and client reference based on a predefined cryptographic function; analyze a payload of an API call from the client to identify the at least one encrypted pair; and decrypt the at least one encrypted pair identified from the API call, to receive at least one pair of server's object reference and client reference, where the decryption is carried out based on the predefined cryptographic function; and a server, in communication with the processor and configured to: block the API call if the decrypted client reference does not match the retrieved authenticated client reference.

In some embodiments, the processor may be configured to instruct the client device to block the API call. In some embodiments, the processor may be configured to send the at least one encrypted pair to the client device. In some embodiments, the processor may be configured to replace server's object references from the payload with the at least one encrypted pair. In some embodiments, the client reference may be authenticated by an authentication layer at the server.

In some embodiments, at least one pair of object reference and client reference may be encrypted as a global unique identifier (GUID). In some embodiments, the authentication may be at least one access token or a JSON web token (JWT). In some embodiments, the processor may be configured to: encrypt every object reference with a hash function, and generate a hash map to point to the identified object reference.

In some embodiments, where the processor may be configured to identify server's object references by identifying fields within the payload from the server that correspond to object references.

There is thus provided, in accordance with some embodiments of the invention, a method of securing unauthenticated communication between a server and a client device, the method including: analyzing, by a processor, an application programming interface (API) payload from the server to identify server's object references; retrieving, by the processor, a session reference, where the session reference is retrieved during a current communication session between the server and the client device; encrypting, by the processor, at least one pair of server's object reference and session reference based on a predefined cryptographic function;

analyzing, by the processor, a payload of an API call from the client device to identify the at least one encrypted pair; decrypting, by the processor, the at least one encrypted pair identified from the API call, to receive at least one pair of server's object reference and session reference, where the decryption is carried out based on the predefined cryptographic function; and blocking the API call if the decrypted session reference does not match the retrieved session reference.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Figure 1:
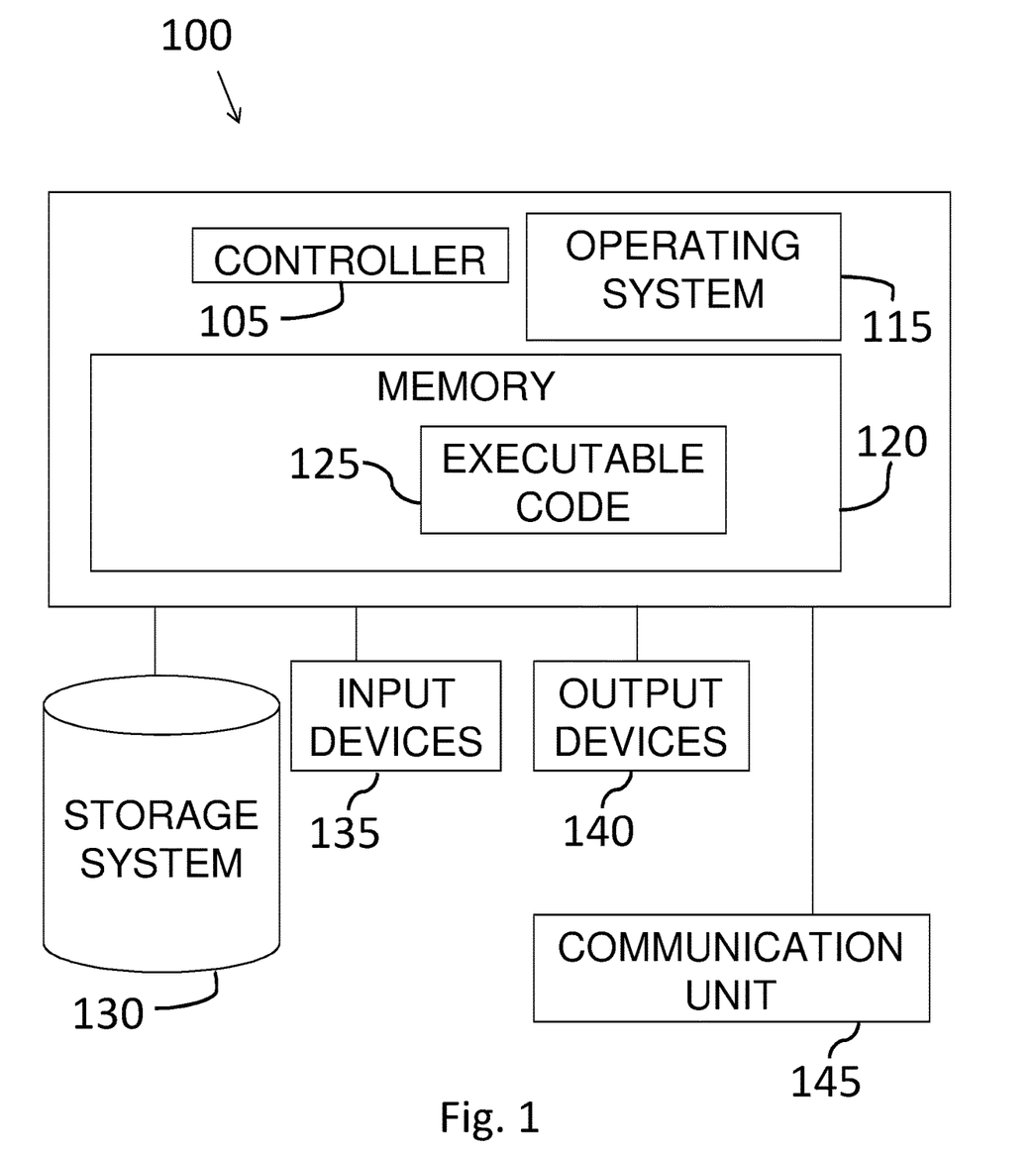
FIG. 1 shows a block diagram of a computing device, according to some embodiments of the invention.

Reference is made to FIG. 1, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device(s) 100, for example, to act as the various devices or the components shown in FIG. 2. For example, system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of similar and/or different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPUs), a plurality of graphics processing units (GPUs), or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

According to some embodiments, systems and methods are provided for securing application programming interfaces (APIs) such as web API's and/or mobile API's and/or server to server API's, for instance against broken or unsecure object level authorization. Object level authorization is an access control mechanism that may be implemented at the code level to validate that one user may only access objects (e.g., any information to which the application has access to) that they should have access to.

Figure 2A:
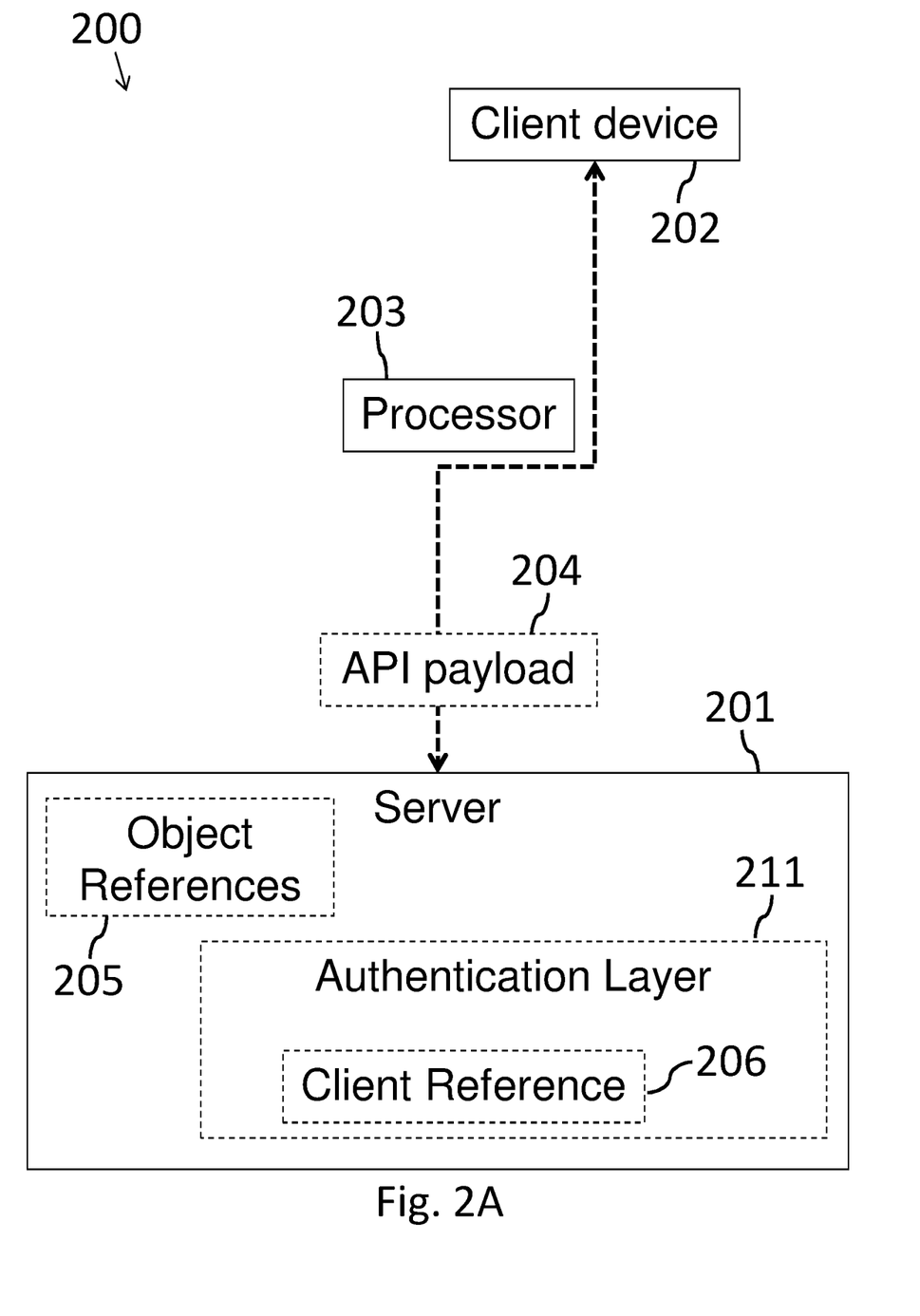
FIG. 2A shows a block diagram of a system for secured communication between a server and a client device, according to some embodiments of the invention.
Figure 2B:
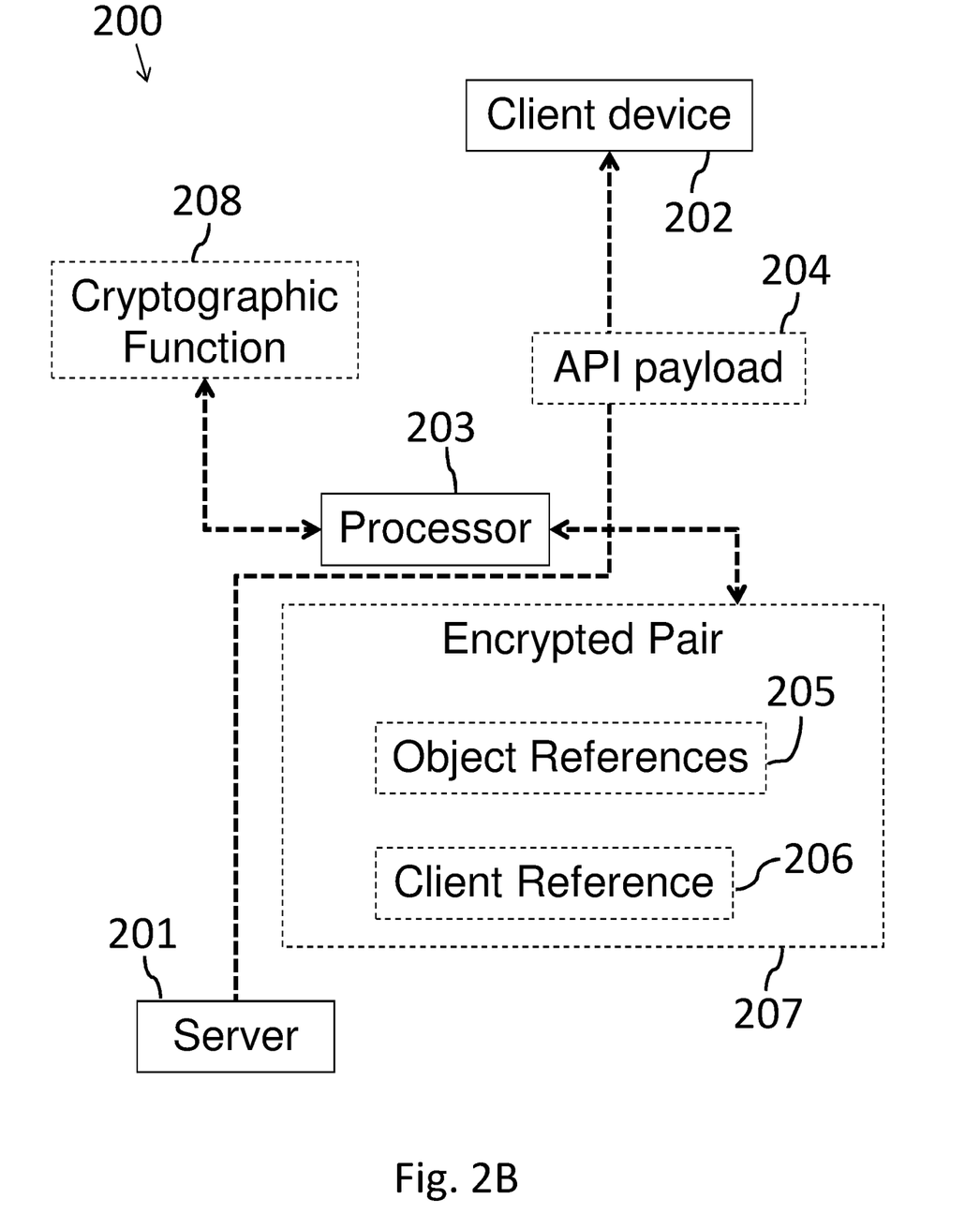
FIG. 2B shows a block diagram of additional elements of the system for secured communication between a server and a client, according to some embodiments of the invention.
Figure 2C:
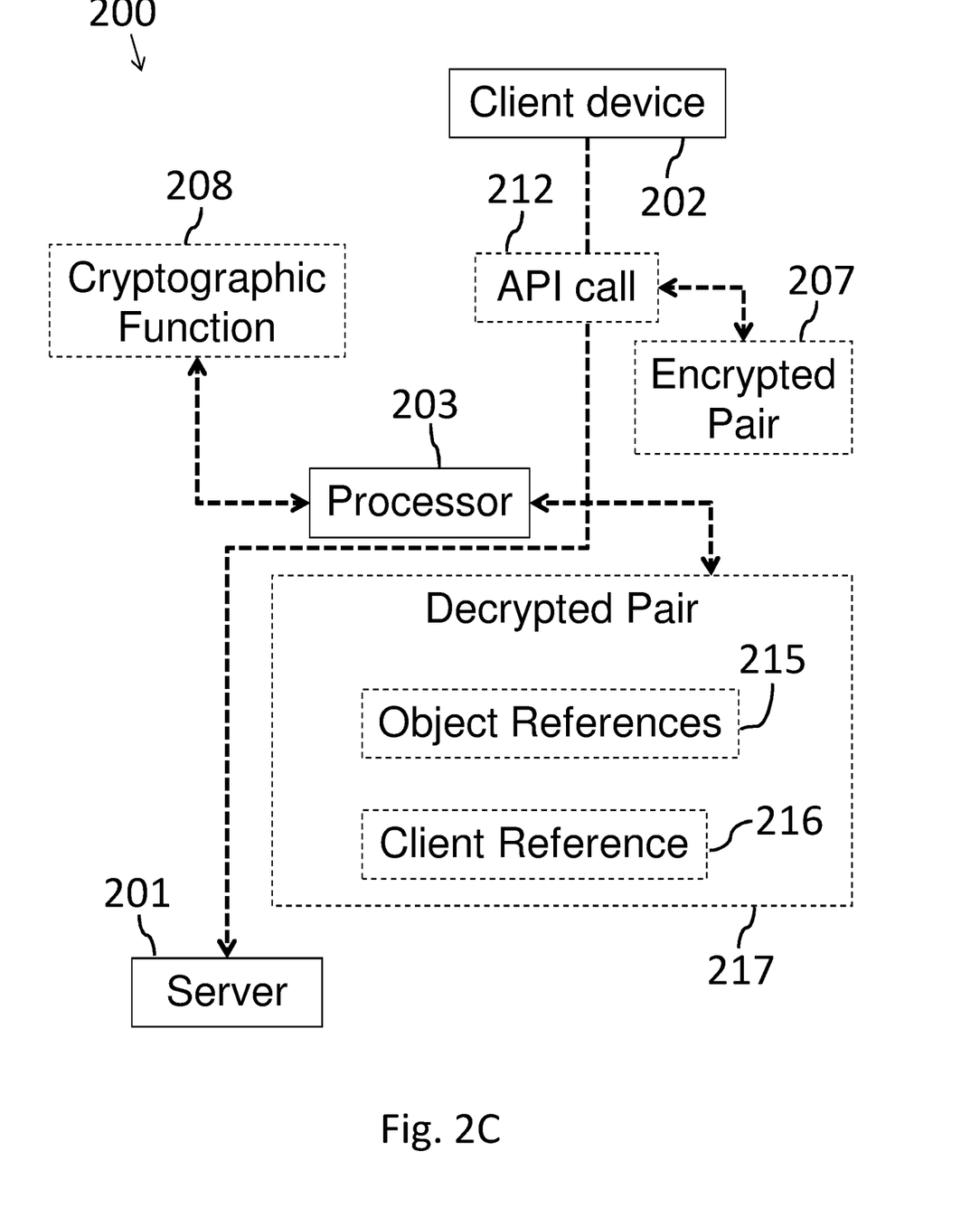
FIG. 2C shows a block diagram of additional elements of the system for secured communication between a server and a client, according to some embodiments of the invention.

Reference is now made to FIGS. 2A-2C, which show several block diagrams of a system 200 for secured communication between a server 201 and a client device 202, according to some embodiments. In FIG. 2, hardware elements are indicated with a solid line and the direction of arrows may indicate the direction of information flow.

The server 201 and/or the client device 202 may be computing devices (e.g., such as computing device 100 shown in FIG. 1) that communicate therebetween. For example, the client device 202 may be a smartphone sharing data with the server 201 (e.g., over the Internet) using a dedicated API.

In some embodiments, the communication between the server 201 and the client device 202 may represent communication between the server 201 and a user that uses the client device 202 (e.g., a server or a mobile computing device). For example, different users may communicate with the server 201 using the same client device 202.

Referring to FIG. 2A, the server 201 and the client device 202 may be in a communication session where the client device 202 is authenticated by the server 201. For example, the server 201 may include an authentication layer 211 for authenticating client devices. The communication session may be between the server 201 and the client device 202 that are communicating therebetween.

In some embodiments, the client device 202 requests server's object references 205, for example for future use as references to the server 201. After the server 201 authenticates the client reference 206 of the client device 202, for instance via the authentication layer 211, the client device 202 may accordingly retrieve the server's object references 205.

Generally, a reference may be a value that enables a computer program to indirectly access information or data, such as a variable's value or a record, in the computer's memory or in some other storage device. Thus, the server's object reference 205 may be a reference to an object within the server 201 to be used by the client device 202, where the object may be any datum of the server 201. For example, the client device 202 may request to retrieve an image object from the server 201, so that an image reference may be provided to the client device 202 instead of the object in order to allow the client device 202 to access that object at a later time for instance.

The system 200 may include a processor 203 (e.g., such as controller 105 shown in FIG. 1), in communication with the client device 202 and/or the server 201, in order to analyze and/or secure the communication between the server 201 and the client device 202. The processor 203 may be for instance deployed between the server 201 and the client device 202 as a hardware and/or a software component (e.g., implemented as an encryption/decryption layer).

For example, the processor 203 may be deployed as part of an API gateway, a Web Application Firewall (WAF), and/or as a separate component from the application backend, for instance the processor 203 may execute an algorithm to secure the communication.

In some embodiments, the processor 203 is located in a reverse proxy mode (similar to a WAF), and/or as part of an API gateway, and/or as a service running on the server, and/or implemented as a piece of code embedded in every micro service (e.g., as a docker plugin).

According to some embodiments, the processor 203 intercepts and/or analyzes an API payload 204 from the server 201 to identify server's object references 205 (or identifiers). For example, the processor 203 may identify the server's object references 205 following a request or call from the client device 202.

The payload is the part of transmitted data that is the intended message, while the headers and metadata are sent only to enable payload delivery. Thus, the processor 203 may identify within the payload 204 the fields that correspond to object references.

In some embodiments, identification of the server's object references 205 is carried out through a configuration schema of API traffic, and/or through automatic detection using dedicated algorithms such as machine learning algorithms and/or text analysis tools.

API traffic may include any data format, such as XML, Extensible Markup Language, (for example as in the Simple Object Access Protocol (SOAP) protocol), binary data, unstructured data etc. In another example, API's may be generally anything you send a request to a server and get data back, even a Hypertext Transfer Protocol (HTTP) request that returns Hypertext Markup Language (HTML) may be considered an API.

After identification of the server's object references 205, the processor 203 may retrieve a client (or user) reference 206, as obtained from the authentication layer 211 in case that authentication exists in that endpoint. For example, the authentication layer 211 may be an access token, a JavaScript Object Notation- (JSON) Web token (JWT), or a username.

According to some embodiments, if a communication session is unauthenticated (e.g., by the authentication layer 211), then a session reference of the communication session between the server 201 and the client device 202 may be used instead of the client reference 206. For a communication session between the server 201 and the client device 202, the session reference 205 may be a reference to the communication session itself, for instance by a session identification number.

For example, the processor 203 may find every reference to or mention of an object reference in the payload 204. Accordingly, the processor 203 may retrieve an authenticated client reference 205, where the client reference is retrieved during a current communication session between the client device 202 and the server 201.

In some embodiments, the client device 202 sends an API call to the server 201 that is intercepted or received by the processor 203, such that the processor 203 also receives the response from the server 201 including the server's object references 205.

In some embodiments, the processor 203 identifies pairs of server's object reference 205 and corresponding client reference 206 relating to the client device 202. Referring to FIG. 2B, the processor 203 may encode or encrypt at least one pair 207 of server's object reference 205 and client reference 206 based on a predefined cryptographic function 208.

In some embodiments, the encryption is carried out by generation of a new encoded global unique identifier (GUID) based on the identified pair of server's object reference 205 and client reference 206. The predefined cryptographic function 208 (e.g., a hash function) may be a standard SHA256 hash for instance. Other cryptographic functions may be used.

The newly generated encoded pair(s) 207 may be inserted into the payload 204 to replace the original server's object reference 205, while the rest of the payload 204 remains unchanged. For example, object references may be replaced by cryptographically secure and unique hashes. Accordingly, the client-side application 202 may receive these objects for its internal usage so as to refer only to them. Accordingly, the client device 202 receives from the processor 203 the at least one encrypted pair 207 instead of the server's object references 205. At this stage, neither of the server 201 and the client device 202 may be aware that the processor 203 carried out any operation and replaced the server's object references 205 in the payload 204.

For example, prior to encoding, the server's object reference may be "1234-2345-3456-4567", and after encoding as "123e4567-e89b-12d3-a456-426614174000". In another example, encryption may be carried out with hash-maps, keeping a hash table with hashes pointing to pairs of original references and the client references. In another example, encryption may be carried out with substituting on the fly references with encoded references and/or any other substitution of the actual reference with a token.

Referring now to FIG. 2C. In the state as shown in the example of FIG. 2C, the client device 202 received the encrypted pair 207 from the processor 203 as the server's object references 205, and may now issue an API call 212 for a particular object at the server 201.

According to some embodiments, the processor 203 analyzes a payload of the API call 212 from the client 202 to identify the at least one encrypted pair 207.

In some embodiments, the processor 203 decodes or decrypts the at least one encrypted pair 207 that is identified from the API call 212, after the original server's object reference 205 are replaced with the encrypted pair 207. Thus, the processor 203 may decrypt at least one pair 217 of object reference 215 and client reference 216, where the decryption is carried out based on the predefined cryptographic function 208. For example, the processor 203 may decrypt the object reference 205 (or identifiers) as it is returned from the client device 202, while both server 201 and client device 202 are unaware that the object reference 205 are replaced.

The processor 203 may compare the decrypted object references 215 to the server's object references 205 obtained from the authenticated pair. In some embodiments, the processor 203 may compare the decrypted client reference 216 to the client reference 206 obtained from the authenticated pair.

The processor 203 may instruct the server 201 or the client device 202 to block the API call 212, if the decrypted client reference 216 does not match (e.g., is not the same as) the retrieved authenticated client reference 206. For example, this may occur when an HTTP "403 forbidden" status code is determined.

According to some embodiments, the processor 203 allows an intermediate security layer for communication between the server 201 and the client device 202, in order to prevent malicious parties from interfering with the communication (e.g., stealing data). The communication between the server 201 and the client device 202 may be carried out seamlessly such that none of the client devices 202 is aware of the presence of the processor 203. For example, the client device 202 may receive the encrypted pair 207 from the processor 203, while expecting a response from the server 201, so that the client device 202 may be unaware that the received data is in fact the encrypted pair 207. Thus, the decrypted client reference 216 may be identical to the retrieved client reference 206, since the purpose of the decryption is to validate the identity of the client device 202.

Accordingly, the processor 203 may intercept data from the client device 202 to check if the client reference is matched (e.g., the same identifier as anticipated) or not so as to validate and/or authenticate the identity of the client device 202. In case that there is a mismatch for the client reference, the communication may be blocked. The communication may be blocked by the server 201 and/or by the client device 202 and/or by the processor 203.

The blocking of the communication may be carried out by the client device 202, where the processor 203 may determine a mismatch and instruct the client device 202 to block the API call 212.

In this way it may be ensured that every client device 202 is observing a unique set of object references (that were modified by the processor 203), that only said client device 202 may access since the corresponding payload 204 may be modified with references unique to that client device 202. Accordingly, any attempt to access other objects not presented or authorized to the client device 202 by the server 201 may be denied, and thus a large part of the attack surface is prevented.

In some embodiments, a unique set of object references may be similarly applied to different sessions in the API traffic and/or different devices and/or different groups of users, such that the processor 203 may determine a mismatch between such references and instruct the server 201 and/or client device 202 to block the API call 212.

Figure 3:
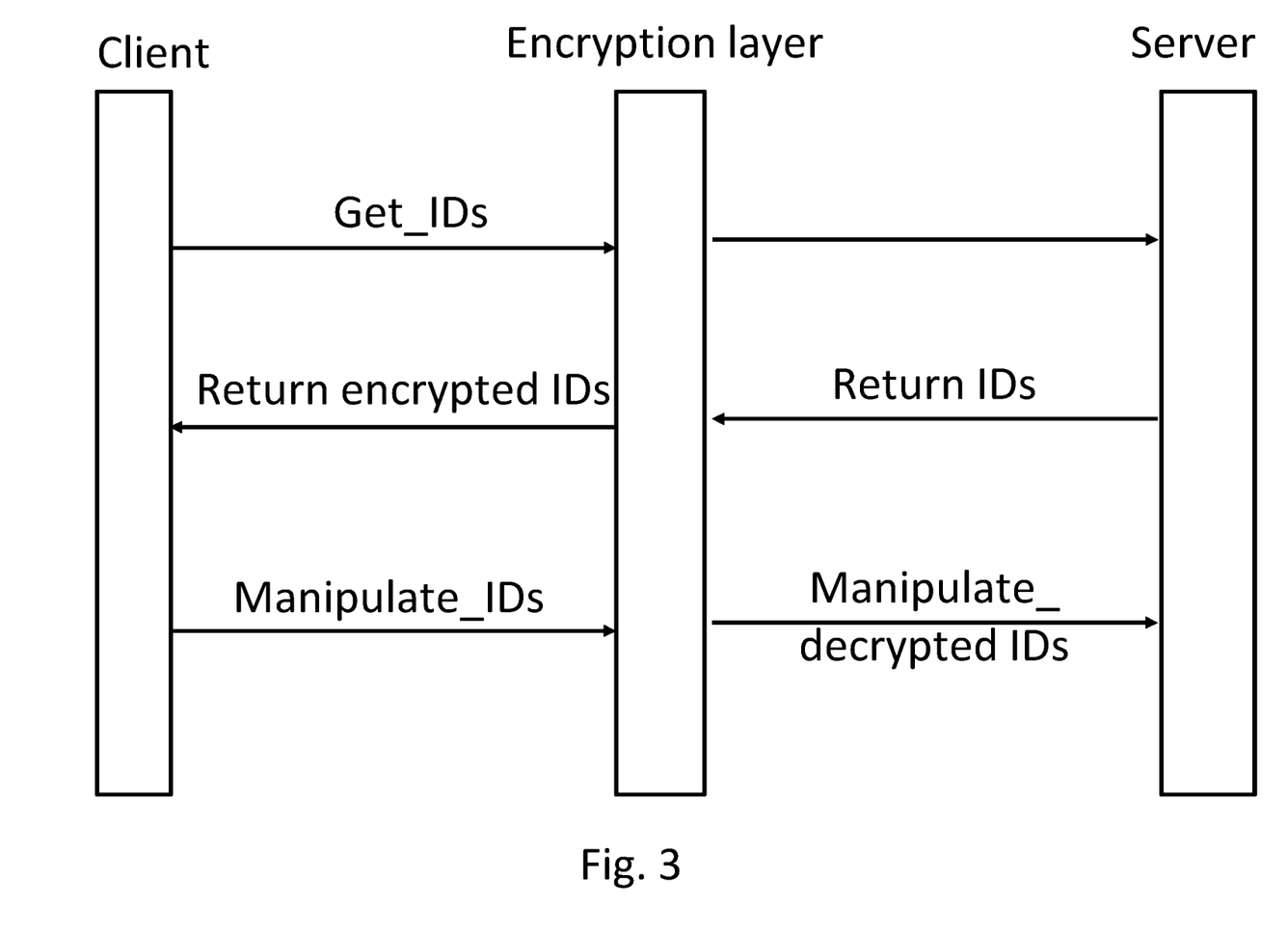
FIG. 3 shows a communication flow between the server and the client device, according to some embodiments of the invention.

Reference is now made to FIG. 3, which shows an example communication flow between the server and the client, according to some embodiments of the invention.

In the example shown in FIG. 3, the client device 202 may send to the server 201 an API call (e.g., a Get_IDs call) that passes via the intermediate encryption layer implemented by the processor 203 such that the processor 203 is aware that the server 201 should send a response. The server 201 may return a list of identifiers (e.g., returns list of object references) that is intercepted by the processor 203 for encryption so that the client device 202 receives encrypted object references. Then, the client device 202 may send a call for a particular identifier from the object references (e.g., a Manipulate_IDs call) that is intercepted by the intermediate encryption layer implemented by the processor 203. The processor 203 may accordingly decrypt the encrypted IDs and the server 201 receives the decrypted IDs call.

Figure 4A:
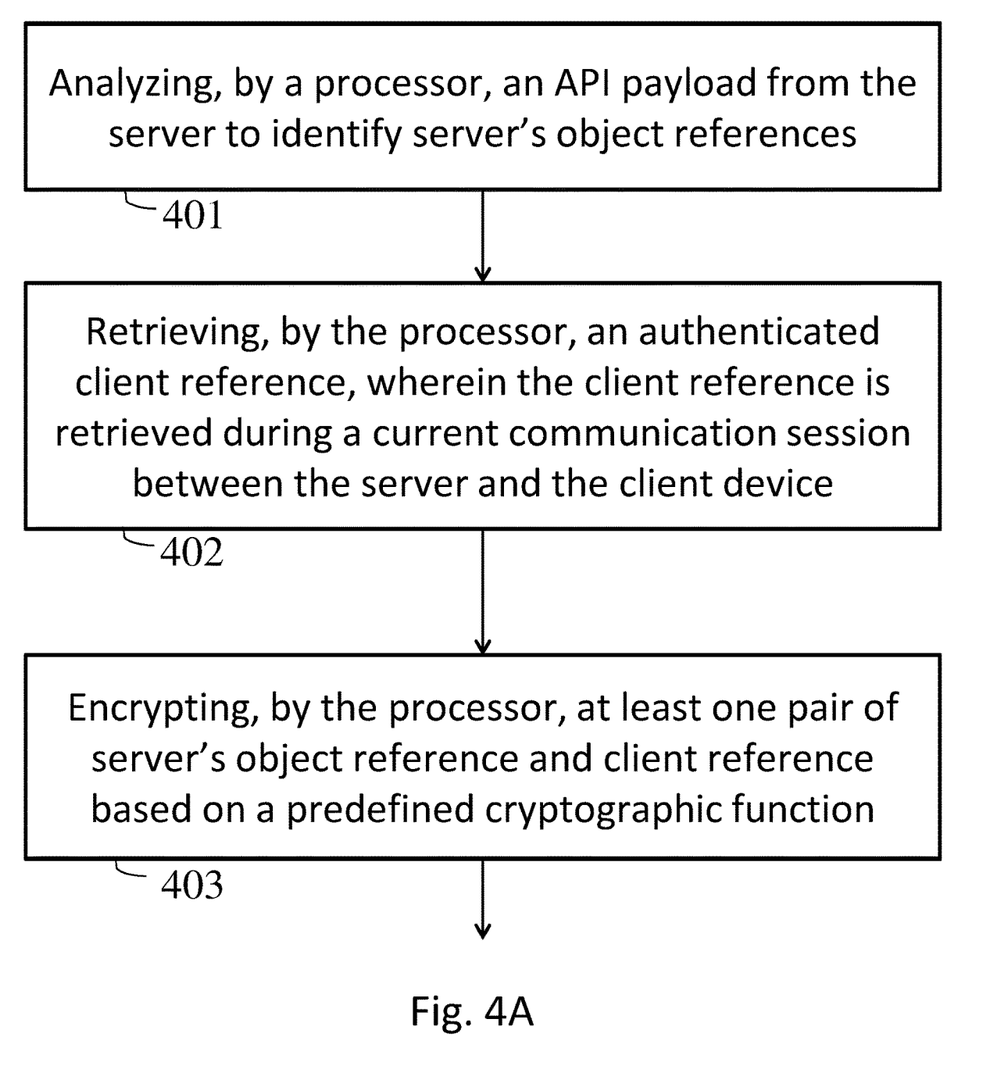
FIGS. 4A and 4B show a flowchart of a method of securing communication between the server and the client device, according to some embodiments of the invention.
Figure 4B:
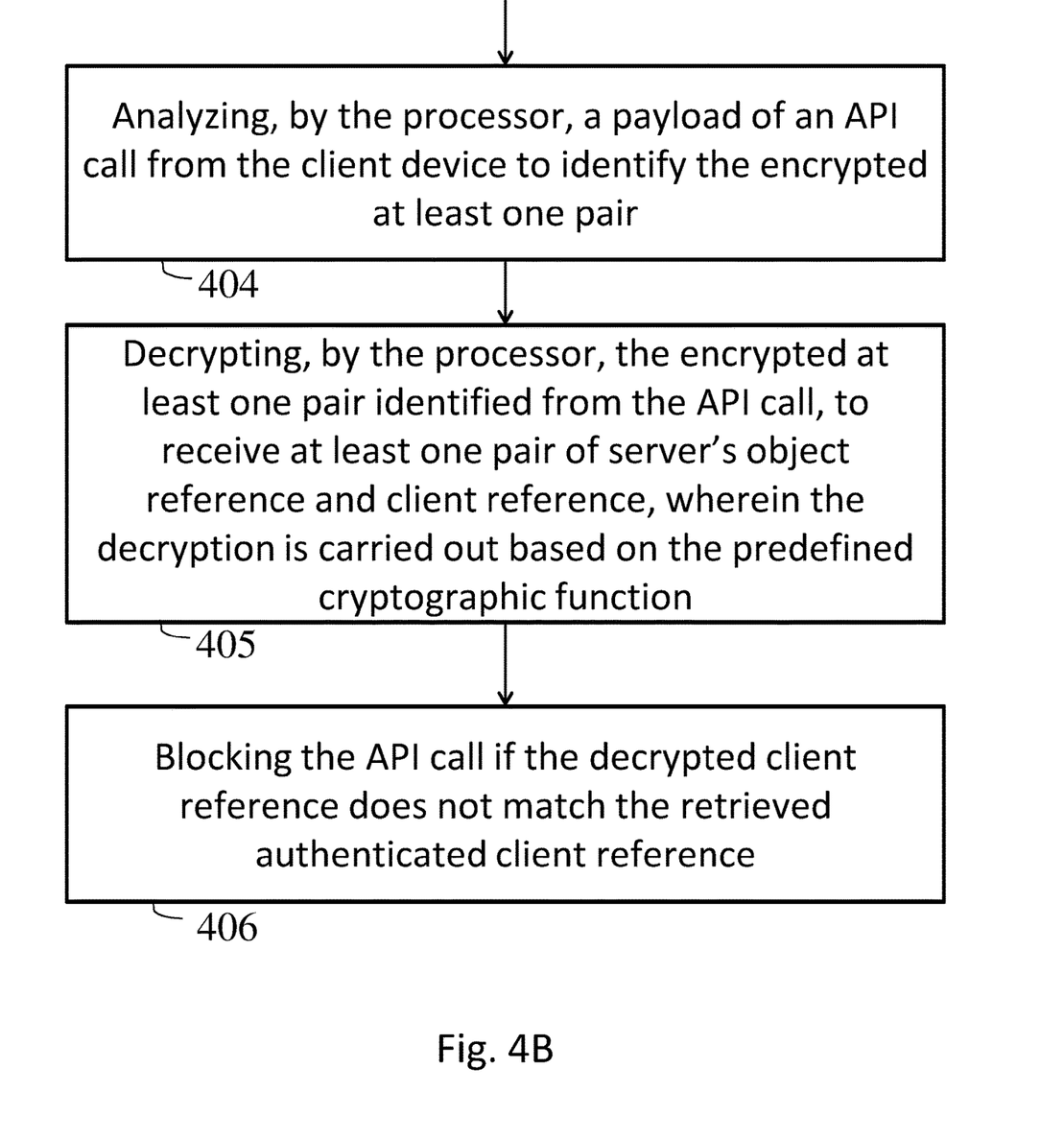

Reference is now made to FIGS. 4A-4B, which show a flowchart of a method of securing communication between the server and the client device, according to some embodiments of the invention.

In Step 401, an API payload from the server may be analyzed (e.g., by the processor) to identify server's object references. In Step 402, authenticated client reference may be retrieved (e.g., by the processor), where the client reference is retrieved during a current communication session between the server and the client device.

The retrieved client reference may be used to prevent malicious parties interfering with the current communication session. In some embodiments, the authorization check (for object reference and client reference pair) may prevent malicious parties from using the retrieved client reference in other sessions. For instance, communication may be allowed by checking by the processor that the same client reference is used by the client device in different portions of the communication.

In Step 403, at least one pair of server's object reference and client reference may be encrypted (e.g., by the processor) based on a predefined cryptographic function. In Step 404, a payload of an API call from the client device may be analyzed (e.g., by the processor) to identify the at least one encrypted pair.

In Step 405, the at least one encrypted pair identified from the API call may be decrypted (e.g., by the processor), to receive at least one pair of server's object reference and client reference, where the decryption is carried out based on the predefined cryptographic function. In Step 406, the API call may be blocked (e.g., by the server or by the client device) if the decrypted client reference does not match the retrieved authenticated client reference, for instance indicating that the decrypted client reference is not authorized for accessing the object. If the decrypted client reference does match the retrieved authenticated client reference, then the API call is allowed and the client device may communicate with the server, for instance unaware of any intermediate encryption and/or checking if the references match.

Figure 5A:
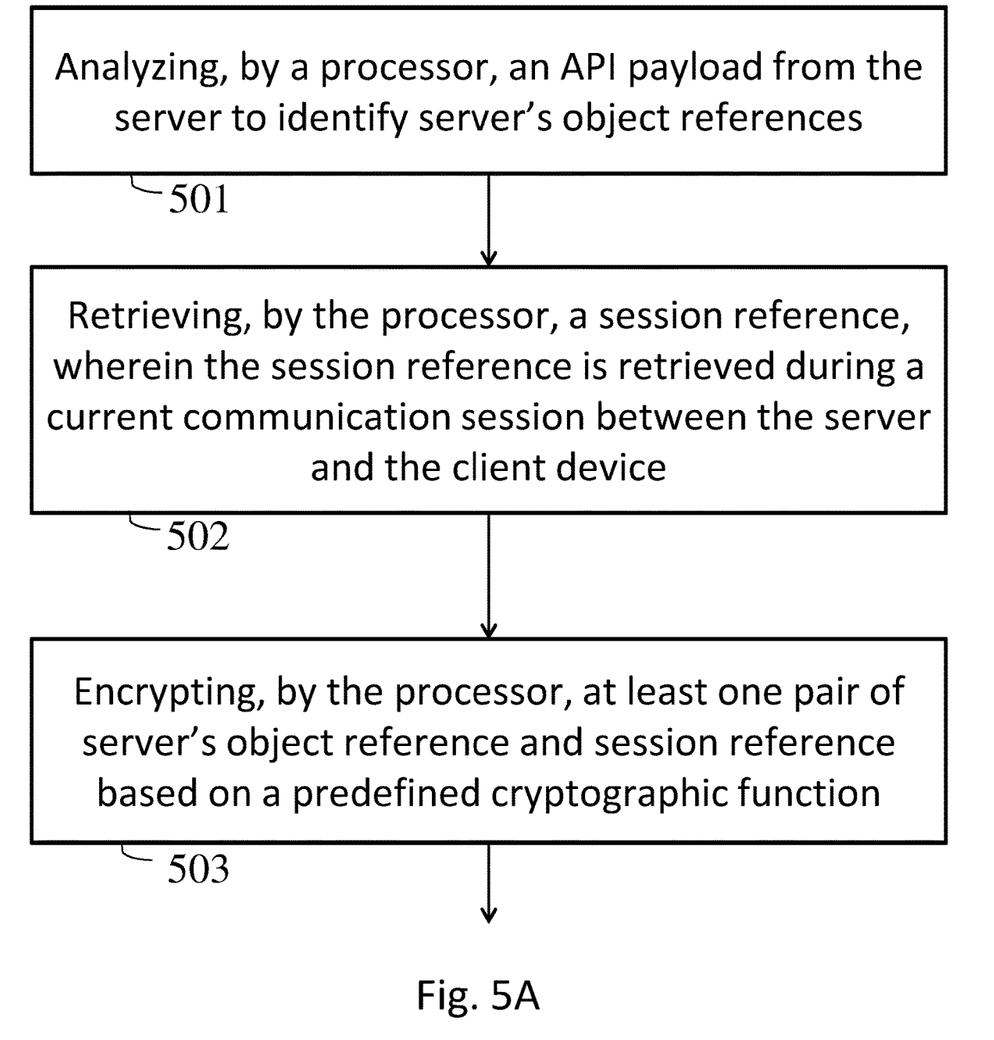
FIGS. 5A and 5B show a flowchart of a method of securing unauthenticated communication between the server and the client device, according to some embodiments of the invention.
Figure 5B:
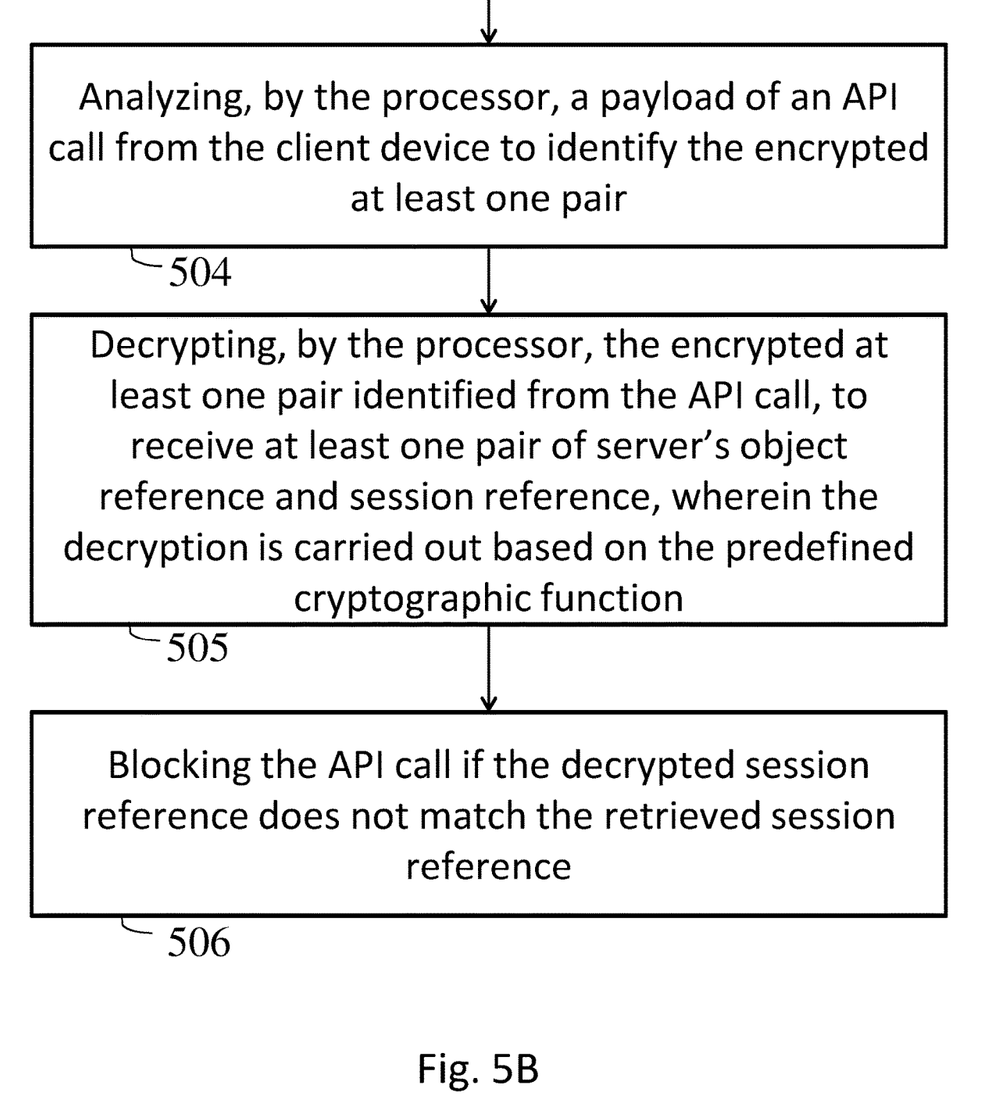

Reference is now made to FIGS. 5A-5B, which show a flowchart of a method of securing unauthenticated communication between the server and the client device, according to some embodiments of the invention. In these embodiments, the session reference may be used instead of the client reference.

In Step 501, an API payload from the server may be analyzed (e.g., by the processor) to identify server's object references. In Step 502, a session reference may be retrieved (e.g., by the processor) from the server and/or from the client device, where the session reference is retrieved during a current communication session between the server and the client device. The retrieved session reference may be used to prevent malicious parties interfering with the current communication session. For instance, communication may be allowed by checking that the same session reference is used in different portions of the communication.

In Step 503, at least one pair of server's object reference and session reference may be encrypted (e.g., by the processor) based on a predefined cryptographic function. In Step 504, a payload of an API call from the client device may be analyzed (e.g., by the processor) to identify the at least one encrypted pair.

In Step 505, the at least one encrypted pair identified from the API call may be decrypted (e.g., by the processor), to receive at least one pair of server's object reference and session reference, where the decryption is carried out based on the predefined cryptographic function. In Step 506, if the decrypted session reference does not match the retrieved session reference, for instance indicating that the decrypted session reference is not authorized for communication, the API call may be blocked (e.g., by the server or by the client device). If the decrypted session reference does match the retrieved session reference, then the API call is allowed and the client device may communicate with the server, for instance unaware of any intermediate encryption and/or checking if the references match.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of securing communication between a server and a client device, the method comprising:
   analyzing, by a processor, an application programming interface (API) payload from the server to identify server's object references;
   retrieving, by the processor, an authenticated client reference, wherein the client reference is retrieved during a current communication session between the server and the client device;
   encrypting, by the processor, at least one pair of server's object reference and client reference based on a predefined cryptographic function;
   analyzing, by the processor, a payload of an API call from the client device to identify the at least one encrypted pair;
   decrypting, by the processor, the at least one encrypted pair identified from the API call, to receive at least one pair of server's object reference and client reference, wherein the decryption is carried out based on the predefined cryptographic function; and
   blocking the API call if the decrypted client reference does not match the retrieved authenticated client reference.

2. The method of claim 1, wherein the blocking comprises instructing, by the processor, the server to block the API call.

3. The method of claim 1, comprises instructing, by the processor, the client device to block the API call.

4. The method of claim 1, further comprising sending, by the processor, the at least one encrypted pair to the client device.

5. The method of claim 1, further comprising replacing, by the processor, server's object references from the payload with the at least one encrypted pair.

6. The method of claim 1, wherein the client reference is authenticated by an authentication layer at the server.

7. The method of claim 1, wherein at least one pair of object reference and client reference are encrypted as a global unique identifier (GUID).

8. The method of claim 1, wherein the authentication is at least one access token or a JSON web token (JWT).

9. The method of claim 1, further comprising:
   encrypting, by the processor, every object reference with a hash function; and
   generating, by the processor, a hash map to point to the identified object reference.

10. The method of claim 1, wherein server's object references are identified by identifying fields within the payload from the server that correspond to object references.

11. A system for secured communication between a server and a client device, the system comprising:
    a processor, in communication with the server and the client device and configured to:
       analyze an application programming interface (API) payload from the server to identify server's object references;
       retrieve an authenticated client reference, wherein the client reference is retrieved during a current communication session between the server and the client device;
       encrypt at least one pair of server's object reference and client reference based on a predefined cryptographic function;
       analyze a payload of an API call from the client to identify the at least one encrypted pair; and
       decrypt the at least one encrypted pair identified from the API call, to receive at least one pair of server's object reference and client reference, wherein the decryption is carried out based on the predefined cryptographic function; and
    a server, in communication with the processor and configured to:
       block the API call if the decrypted client reference does not match the retrieved authenticated client reference.

12. The system of claim 11, wherein the processor is configured to instruct the client device to block the API call.

13. The system of claim 11, wherein the processor is configured to send the at least one encrypted pair to the client device.

14. The system of claim 11, wherein the processor is configured to replace server's object references from the payload with the at least one encrypted pair.

15. The system of claim 11, wherein the client reference is authenticated by an authentication layer at the server.

16. The system of claim 11, wherein at least one pair of object reference and client reference are encrypted as a global unique identifier (GUID).

17. The system of claim 11, wherein the authentication is at least one access token or a JSON web token (JWT).

18. The system of claim 11, wherein the processor is configured to:
    encrypt every object reference with a hash function; and
    generate a hash map to point to the identified object reference.

19. The system of claim 11, wherein the processor is configured to identify server's object references by identifying fields within the payload from the server that correspond to object references.

20. A method of securing unauthenticated communication between a server and a client device, the method comprising:
    analyzing, by a processor, an application programming interface (API) payload from the server to identify server's object references;
    retrieving, by the processor, a session reference, wherein the session reference is retrieved during a current communication session between the server and the client device;
    encrypting, by the processor, at least one pair of server's object reference and session reference based on a predefined cryptographic function;
    analyzing, by the processor, a payload of an API call from the client device to identify the at least one encrypted pair;
    decrypting, by the processor, the at least one encrypted pair identified from the API call, to receive at least one pair of server's object reference and session reference, wherein the decryption is carried out based on the predefined cryptographic function; and
    blocking the API call if the decrypted session reference does not match the retrieved session reference.

* * * * *